United States Patent
Cieslinski

(10) Patent No.: US 8,625,003 B2
(45) Date of Patent: Jan. 7, 2014

(54) DIGITAL CAMERA AND METHOD FOR MONITORING A SIGNAL PROCESSING DEVICE

(75) Inventor: Michael Cieslinski, Ottobrunn (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 257 days.

(21) Appl. No.: 12/940,810

(22) Filed: Nov. 5, 2010

(65) Prior Publication Data

US 2011/0273587 A1 Nov. 10, 2011

(30) Foreign Application Priority Data

Nov. 13, 2009 (DE) .......................... 10 2009 053 280

(51) Int. Cl.
*H04N 5/76* (2006.01)
*G06K 9/00* (2006.01)

(52) U.S. Cl.
USPC ........................................ 348/231.6; 382/162

(58) Field of Classification Search
USPC ....................................................... 348/231.5
See application file for complete search history.

(56) References Cited

U.S. PATENT DOCUMENTS

| | | | |
|---|---|---|---|
| 4,665,436 A * | 5/1987 | Osborne et al. ............ | 348/400.1 |
| 6,496,274 B1 * | 12/2002 | Telle .............................. | 358/1.1 |
| 8,045,013 B2 * | 10/2011 | Abe ........................... | 348/222.1 |
| 2004/0041926 A1 * | 3/2004 | Takano et al. ................ | 348/241 |
| 2005/0036678 A1 * | 2/2005 | Loew ............................ | 382/162 |
| 2006/0061355 A1 * | 3/2006 | Wendling et al. ........ | 324/207.25 |
| 2006/0115178 A1 | 6/2006 | Fan | |
| 2010/0066861 A1 * | 3/2010 | Sakagami .................. | 348/231.6 |

FOREIGN PATENT DOCUMENTS

| | | |
|---|---|---|
| DE | 60304785 T2 | 4/2007 |
| EP | 1708197 A2 | 10/2006 |
| EP | 2083421 A1 | 7/2009 |

OTHER PUBLICATIONS

German Search Report dated Oct. 12, 2010 and translation thereof.

* cited by examiner

*Primary Examiner* — Sinh Tran
*Assistant Examiner* — Christopher K Peterson
(74) *Attorney, Agent, or Firm* — Amster, Rothstein & Ebenstein LLP

(57) ABSTRACT

A digital camera includes an image sensor for producing analog image signals; an analog/digital converter for converting the image signals into digital raw data; and a signal processing unit for producing processed data from the raw data, wherein the signal processing device has a signal output. The camera has at least one first buffer memory for buffering at least some of the digital raw data and an evaluation device which is made to compare raw data stored in the first buffer memory with the processed data.

22 Claims, 2 Drawing Sheets

DIGITAL CAMERA AND METHOD FOR MONITORING A SIGNAL PROCESSING DEVICE

Figure 1:
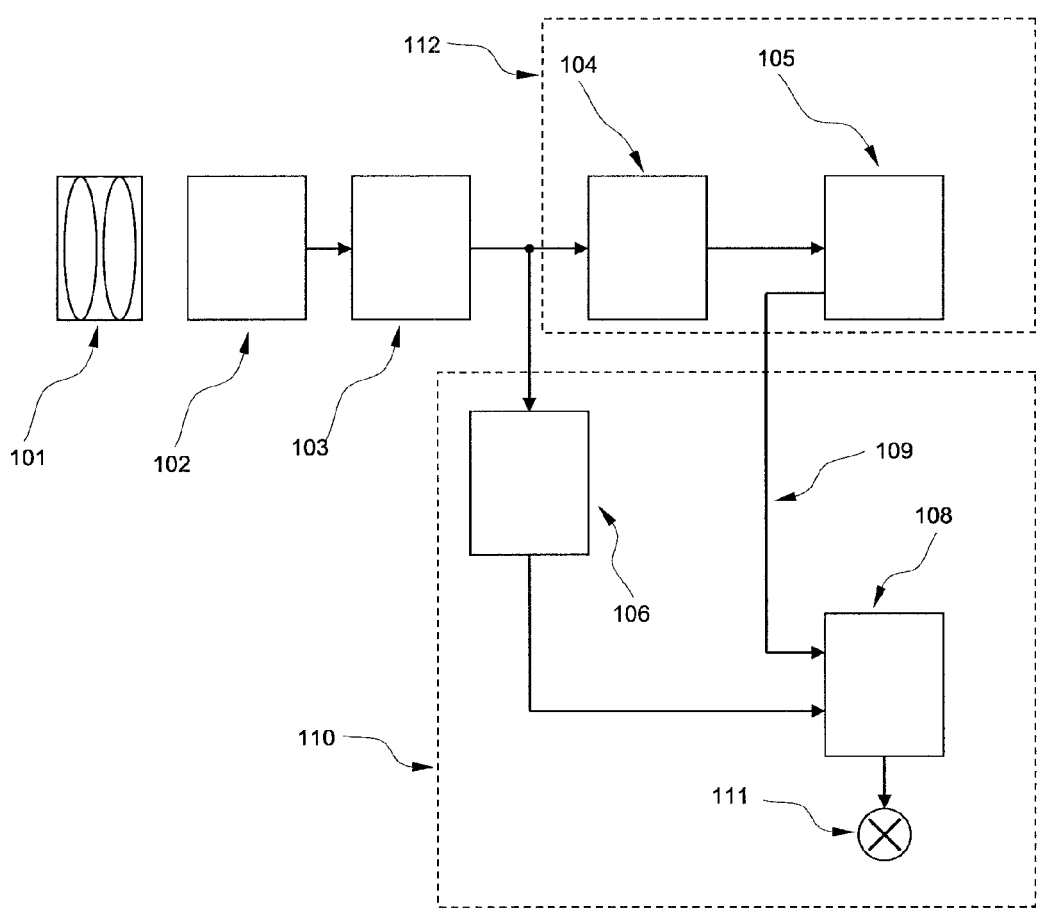

The present invention relates to a digital camera having an image sensor for producing analog image signals, having an analog/digital converter for converting the image signals into digital raw data, and having a signal processing device for producing processed data from raw data, wherein the signal processing device has a signal output.

Known electronic cameras include an image sensor which comprises a plurality of light-sensitive elements or pixels which are arranged in rows and columns and which convert light incident through an objective of the camera into electrical signals. For reading out an image, each of the pixels is addressed and a signal which is proportional to a charge of the pixel collected by an exposure is directed to an output of the image sensor and is converted into a digital signal.

The image signals converted into digital raw data in this manner are usually further processed in a subsequent digital signal processing device. This digital processing can include one or more of the following processes:

carrying out correction steps, in particular with respect to a dark current, to an offset value, to the amplification, to the color value or values or to the illuminant;
filtering for correction with respect to the taking aperture, to the contrast transfer function and/or to the image noise;
changing the spatial image resolution; or
compressing the raw data.

The processed data obtained by the signal processing are subsequently stored in a memory device.

Electronic cameras with digital signal processing are today increasingly also used in the production of cinema movies. In this application, very high costs occur as a rule for actors and the production crew. It is therefore particularly important that the cameras used work faultlessly.

With defective electronic cameras, above all those faults are particularly disadvantageous which are not immediately recognized. Whereas a total failure of an electronic camera is easily recognizable and the respective camera is replaced, faults which only cause minor image interference and are due e.g. to a change in the characteristics of electronic components or increased noise may possibly initially remain unrecognized.

Such image interference can nevertheless become clearly visible on a projection of the cinema film on a large screen and may even be amplified by subsequent image corrections carried out in postproduction.

When image interference occurs, the affected images must be subsequently manually corrected in a laborious process. In the worst case, the shoot will have to be repeated, which is associated with considerable additional costs.

Usually, the correct function of an electronic camera is verified in that defined patterns are filmed with the camera. They typically contain different, calibrated color charts, patterns with a high contrast extent and homogeneously illuminated surfaces. For example, an Ulbricht sphere with large-format patterns is used which is filmed in a darkened room.

Such equipment is, however, frequently too bulky to be used at the film location. In addition, special analysis software which requires the presence of a computer and special technical knowledge of the operator for its operation is required for the evaluation of the taken test data, in particular for recognizing errors in signal processing.

It is therefore the object of the invention to provide a digital camera and a method for monitoring a signal processing device of a digital camera which also enables a function monitoring during the ongoing operation of the camera.

This object is satisfied by a digital camera having the features of claim 1 and in particular in that the camera has at least one first buffer memory for the buffering of at least some of the digital raw data and an evaluation device which is made to compare raw data stored in the first buffer memory with processed data of the camera.

It is hereby achieved that the digital raw data can be recorded independently of a regular data flow of the camera and can be compared with the processed data by means of the evaluation device during the further operation or at a later time without the ongoing operation of the camera having to be interrupted for a check of the signal processing device. A control data path independent of the main data path is thus formed which allows the evaluation of samples, namely in that data from the main data path are compared with corresponding data from the control data path. If significant deviations are found between the data, a defect in the camera is assumed and an error signal is generated, for example to output an optical and/or acoustic error message to the cameraman. In this respect, deviations can be ignored within predetermined tolerance limits.

To ensure the correct function of the signal processing device of the main data path, the raw data present in the first buffer memory can therefore be processed independently of the main data path in a control data path into data which correspond to the processed result data of the camera (which are applied to the output of the signal processing device and which are recorded in a data memory or in a second buffer memory). It is expedient in this respect if the stored raw data and the processed data to be compared are produced from the same image signals.

In accordance with an advantageous embodiment, the signal output of the signal processing device is connected to a data memory, wherein the data memory has an output which is connected to an input of the evaluation device. In this embodiment, a data memory for the permanent storage of the processed image data, for example a semiconductor memory, a magnetic tape, a hard disk or another optical, magnetic or magneto-optical memory device, which is anyway present for the recording of the processed image data, is used for the provision of the processed data to be checked. The anyway present data memory is in particular a removable data memory releasably couplable to the camera. It is thereby possible to equip the camera with only one buffer memory. It is advantageous in this respect if the data memory has a feedback channel or a separate output for the supply of the processed data to the evaluation device, i.e. the output for the connection to the evaluation device is provided in addition to the regular output of the data memory.

To facilitate an association of the raw data stored in the buffer memory with the corresponding processed data, it is advantageous if the circuit arrangement is made such that the storage of the raw data includes an additional storage of a feature characterizing the respective raw data. It is additionally of advantage also to provide the processed data with a corresponding characterizing feature.

This characterizing feature can, for example, have an unambiguous number and/or a timestamp.

In accordance with a further preferred embodiment, the signal output of the signal processing device is connected to a second buffer memory for the buffering of the processed data, wherein an input of the evaluation device is connected to an output of the second buffer memory. In this embodiment, both the digital raw data and the processed data are stored in buffer memories. A comparable evaluation is thereby possible without having to make use of an internal or external data memory for providing the processed data.

The object of the invention is furthermore satisfied by a method having the features of claim 8 and in particular by a method for monitoring a signal processing device of a digital camera, wherein image signals are produced in the camera, the image signals are converted into digital raw data and the digital raw data are processed into processed data by means of the signal processing device. The method in accordance with the invention is characterized by the steps: storing at least some of the digital raw data in a first buffer memory; and comparing the raw data stored in the first buffer memory with the processed data.

In accordance with a preferred embodiment of the method in accordance with the invention, the processing of the raw data includes at least one of the following steps: carrying out correction steps, in particular with respect to a dark current, to an offset value, to the amplification, to the color value or values or to the illuminant; filtering for correction with respect to the taking aperture, to the contrast transfer function and/or to the image noise; changing the spatial image resolution; or compressing the raw data.

If one of the above-named steps was applied to the raw data, it is usually no longer possible subsequently to correct image interference caused by a faulty processing.

It is therefore advantageous to carry out the method in accordance with the invention during the ongoing operation, for example at the start of a new taking sequence or in the manner of spot-checks at specific time intervals so that it is avoided that a defective camera is operated further over a longer period of time without defects.

In accordance with a further advantageous embodiment, the storage of the raw data and the comparison of the stored raw data with the processed data include the following steps: fixing the size and position of an image section; subsequently storing the road data belonging to this image section in the first buffer memory; and comparing the raw data belonging to this image section with the processed data for this image section, wherein the position and/or the size of the image section is/are changed before a repeat storage of raw data in the first buffer memory. Due to the only section-wise storage of the raw data, buffer memories can also be used to cut costs whose storage spaces are not sufficient for storing a complete image.

In order nevertheless to obtain a complete check of the signal processing device over the course of time, in an advantageous embodiment of the invention, the storage of the raw data and the comparing of the stored raw data with the processed data are carried out in a plurality of checking processes for a number of image sections, wherein the number of image sections complexly covers the surface of an image sensor provided for producing the image signals. It is thus ensured that a statement is possible on the function capability of the signal processing for all pixels at the end of the checking processes.

Further advantageous embodiments of the invention are set forth in the dependent claims, in the description and in the drawing.

The invention will be described in the following with reference to embodiments and to the drawing.

There are shown, schematically in each case

Figure 2:
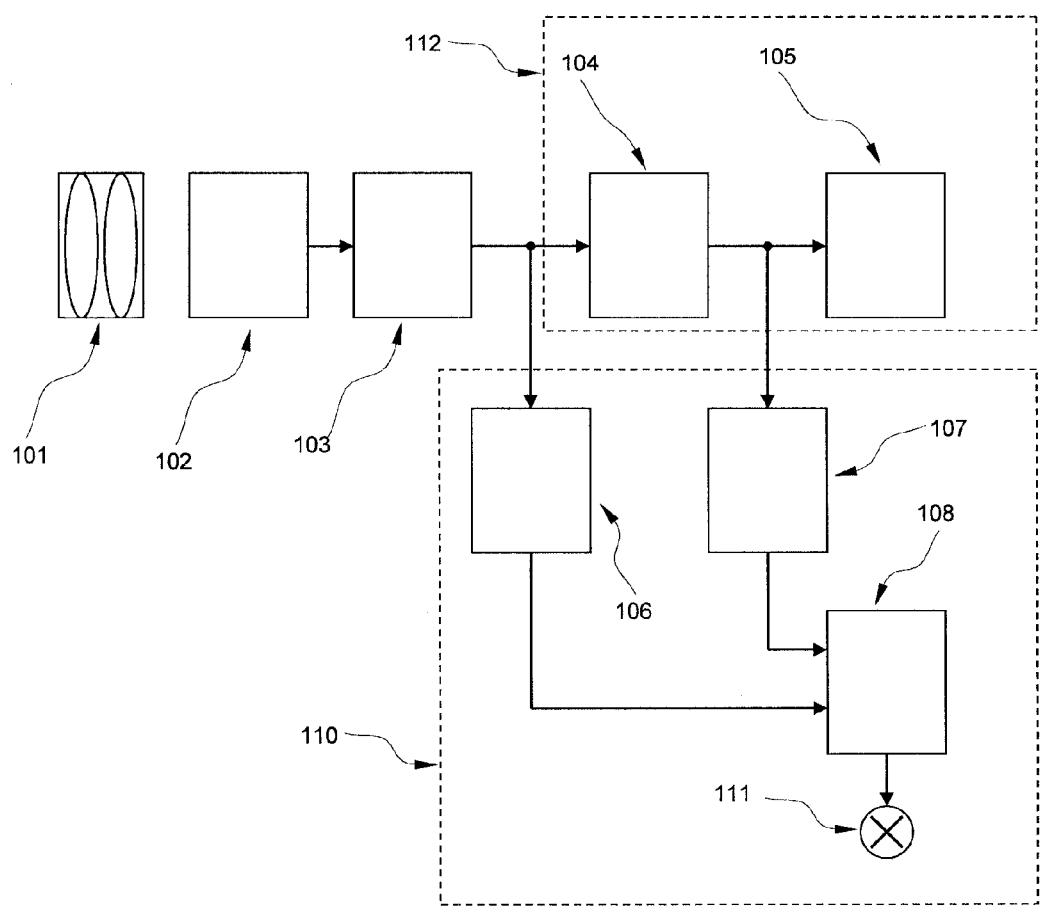

FIG. 1 a first embodiment of a digital camera in accordance with the invention; and FIG. 2 a second embodiment of a digital camera in accordance with the invention.

The camera shown in FIGS. 1 and 2 has an objective 101 which produces an image on an image sensor 102 which includes a plurality of light-sensitive elements or pixels arranged in rows and columns and which converts light incident through the objective into electric signals. A CCD sensor or a CMOS sensor can, for example, be provided as the image sensor 102.

For the reading out of an image, each of the pixels is addressed and a signal which is proportional to a charge of the pixel collected by an exposure is directed to an output of the image sensor which is connected to one or more analog/digital converters 103. For reasons of clarity, only one analog/digital converter 103 in which a conversion of the image signals into digital raw data takes place is shown in the Figures.

The analog/digital converter 103 has an output which is connected to a signal processing device 104. In the signal processing device 104, the raw data are subjected to one or more processing steps which, for example, include carrying out correction steps, in particular of offset correction, dark current correction, a gain correction, a color value correction or an illuminant correction. Furthermore, the digital raw data can be corrected by means of a filtering with respect to the taking aperture, to the contrast transfer function (MTF) and/or to the image noise. Finally, a change in the image resolution or a data compression can be carried out to reduce the memory requirement. The signal processing device 104 can be realized by way of example by a so-called FPGA (field-programmable gate array).

An output of the signal processing device 104 is connected to an input of a data memory 105. The data memory 105 can e.g. be optical, magnetic or magneto-optical recording media or also semiconductor memories. The processed data provided by the signal processing device 104 at its output are stored in the data memory 105 or on a corresponding medium of the data memory 105 (so-called main data path 112).

To form a so-called control data path 110, the output of the analog/digital converter 103 is additionally connected to the input of a first buffer memory 106 which is provided for storing the digital raw data. The raw data, but also the processed data, can be provided for the storage in the first buffer memory 106 or in the data memory 105 with a characterizing feature which can e.g. include a continuous numbering or a timestamp. The output of the first buffer memory 106 is connected to a first input of an evaluation device 108.

In the digital camera in accordance with the first embodiment (FIG. 1), the data memory 105 has a feedback channel 109, i.e. an output of the data memory 105 is connected to a second input of the evaluation device 108 to transfer processed data to the evaluation device 108.

If now a function test of the signal processing device 104 should be carried out in the digital camera in accordance with the first embodiment (FIG. 1), raw data produced by the analog/digital converter are first stored in the buffer memory 106. The stored raw data can correspond to the total image area of the image sensor 102 or also only to an image section, i.e. to a part region of the image sensor 102. However, a plurality of images taken one after the other or at the end of specific time intervals can also be saved.

The raw data to be stored in the buffer memory 106 are branched off from the regulator data flow which is stored in the data memory 105 after the processing in the signal processing device 104. Processed data are thus available in the data memory 105 which were produced from the same image signals as the raw data stored in the buffer memory 106.

For evaluation, both the row data stored in the first buffer memory 106 and the processed data stored in the data memory 105 are transferred to the inputs of the evaluation device 108 which processes the raw data stored in the first buffer memory 106 and subsequently compares both data with one another to be able to recognize any malfunctions of the signal processing device 104. The characterizing feature stored with the data allows the respective association of the data. The evaluation device 108 can, for example, have a software-controlled processor whose control program maps the processing steps carried out by the signal processing device 104 in the main data path 112 and applies them to the raw data present in the buffer memory 106.

The raw data processed in this manner in the evaluation unit 108 are compared in a comparison unit provided in the evaluation unit 108 with the processed data accessed from the data memory 105, wherein the comparison unit can likewise include a software-controlled processor, in particular the processor simultaneously responsible for the processing of the raw data stored in the buffer memory 106.

Such a software mapping of the processing steps in the evaluation unit 108 is associated with a high calculation effort, wherein specific errors, in particular rounding errors, can occur which can also result in certain deviations of the data forming the basis of the comparison with a correct function of the signal processing device 104.

These slight deviations are, however, not necessarily critical and can be ignored in the comparison in that a difference value is formed between the data to be compared, for example pixel-wise, and the frequency of specific difference values is determined. In addition, the mean difference value of the data to be compared can be determined. Limit values can then be preset for the proportional frequency of specific difference values. For example, the difference for at most 10% of all pixels may only amount to a predetermined numerical value, for at most 1% of all pixels only to a predetermined, somewhat higher numerical value, for at most 0.1% of all pixels only to a predetermined, even higher numerical value, and for no pixel more than a predetermined, yet higher numerical value. In addition, the mean difference value may not be larger than another predetermined numerical value.

Generally, however, different comparison methods are also possible. A quotient can thus be calculated pixel-wise or a weighted difference can be determined by means of look-up tables.

The comparison methods and the underlying limit values are sensibly selected so that just no exceeding of limit values is determined in the proper function of the camera. When the limit values are observed, the data to be compared thus count as substantially the same and the camera as functional.

An exceeding of limit values and thus a malfunction of the camera is communicated to the operator by means of a signal display 111. This signal display 111 can, for example, output an optical and/or acoustic signal and/or a text or symbol message on a display. The signal display 111 can in particular include a multicolor control lamp which signals the proper function of the camera by a green light and a malfunction detected on the basis of an exceeding of a limit value by a yellow light or a red light.

The camera thus has two independent data paths for the data produced by the analog/digital converter 103, namely a main data path 112 conducted over the signal processing device 104 and the data memory 105 and a control data path 110 which is conducted via the buffer memory 106 and the processor which is provided in the evaluation device 108 and which processes the raw data stored in the buffer memory in a similar manner to the signal processing device 104. The data delivered via these data paths 110, 112 are preferably compared randomly in the evaluation unit 108.

The digital camera in accordance with the second embodiment (FIG. 2) differs from the first in that additionally a second buffer memory 107 is provided whose input is connected, like the input of the data memory 105, to the output of the signal processing device 104. An output of the second buffer memory 107 is connected to the second input of the evaluation device 108. A feedback channel 109 in accordance with the first embodiment does not have to be provided.

On a function check of the signal processing device 104 in the digital camera in accordance with the second embodiment (FIG. 2), the processed data are not read into the evaluation device 108 from the data memory 105, but rather from the second buffer memory 107.

The storage of data in the buffer memories 106, 107 takes place such that the raw data produced by the analog/digital converter 103 are provided both to the first buffer memory 106 for storage and to the signal processing device 104. The processed data going back to these raw data and output by the signal processing device 104 are supplied after the signal processing has taken place both to the data memory 105 and to the second buffer memory 107 for storage, wherein the data stored in the second buffer memory 107 can be provided with a characterizing feature for unambiguous identification. With a corresponding synchronization of the storage processes, a marking of the raw data or processed data could alternatively be omitted.

As in the first buffer memory 106, one or more images or image sections can also be stored in the second buffer memory 107.

The comparison of the raw data with the processed data takes place in the evaluation device 108 in the same way as in the first embodiment. The evaluation device 108 is in particular made to map the processing steps provided in the signal processing device 104 for the digital raw data and to apply the mapped processing steps to the raw data stored in the first buffer memory 106 before they are compared with the data stored in the second buffer memory 107. The main data path 112 in this embodiment in turn includes the signal processing device 104 and the data memory 105, whereas the data path conducted over the first buffer memory 106 and the data path conducted over the second buffer memory 107 to the evaluation device 108 together form the control data path 110 in the second embodiment in accordance with FIG. 2.

REFERENCE NUMERAL LIST

101 objective
102 image sensor
103 analog/digital converter
104 signal processing device
105 data memory
106 first buffer memory
107 second buffer memory
108 evaluation device
109 feedback channel
110 control data path
111 signal display
112 main data path

The invention claimed is:
1. A digital camera having an image sensor (102) for producing analog image signals, having an analog/digital converter (103) for converting the image signals into digital raw data, and having a signal processing device (104) for producing processed data from the raw data, wherein the signal processing device (104) has a signal output;
wherein the camera has at least one first buffer memory (106) for buffering at least some of the digital raw data and an evaluation device (108) which is made to com- pare raw data stored in the first buffer memory (106) with the processed data, and wherein the evaluation device (108) is made to produce an error signal if a deviation between the raw data stored in the first buffer memory (106) and the processed data reaches or exceeds at least one predefined limit value, wherein the camera further comprises a warning message output device connected to the evaluation device, the warning message output device adapted to output at least one of an optical warning message, an acoustic warning message or a text or symbol warning message in response to the error signal.

2. A digital camera in accordance with claim 1, wherein an input of the first buffer memory (106) is connected to an output of the analog/digital converter (103).

3. A digital camera in accordance with claim 1, wherein the signal output of the signal processing device (104) is connected to a data memory (105); and wherein the data memory (105) has an output which is connected to an input of the evaluation device (108).

4. A digital camera in accordance with claim 1, wherein the signal output of the signal processing device (104) is connected to a second buffer memory (107) for buffering the processed data; and wherein an input of the evaluation device (108) is connected to an output of the second buffer memory (107).

5. A digital camera in accordance with claim 1, wherein the digital camera is further made such that the storage of the raw data includes an additional storing of a feature characterizing the respective raw data; and wherein the feature preferably has an unambiguous number and/or a timestamp.

6. A digital camera in accordance with claim 1, wherein the evaluation device (108) is made to map processing steps which are provided in the signal processing device (104) for the digital raw data and to apply the mapped processing steps to the raw data stored in the first buffer memory (106) before the raw data stored in the first buffer memory (106) are compared with the processed data.

7. A method for monitoring a signal processing device (104) of a digital camera, wherein image signals are produced in the camera, the image signals are converted into raw data and the digital raw data are processed to processed data by means of the signal processing device (104), comprising the following steps:

storing at least some of the digital raw data in a first buffer memory (106);

comparing the raw data stored in the first buffer memory (106) with the processed data;

producing an error signal when it is determined that a deviation between the raw data stored in the first buffer memory (106) and the processed data reaches or exceeds at least one predefined limit value, outputting at least one of an optical warning message, an acoustic warning message or a text or symbol warning message in response to the error signal.

8. A method in accordance with claim 7, wherein the stored raw data and processed data to be compared are produced from the same image signals.

9. A method in accordance with claim 7, wherein the raw data stored in the buffer memory (106) are adapted to the format of the processed data before the comparison with the processed data.

10. A method in accordance with claim 7, wherein the step of comparing the raw data stored in the first buffer memory (106) with the processed data takes place in a control data path (110) which is independent of a main data path (112) of the camera;

wherein the control data path (110) includes at least the first buffer memory (106) and an evaluation device (108); and wherein the main data path (112) includes at least the signal processing device (104).

11. A method in accordance with claim 7, further comprising the steps:

storing the processed data in a data store (105); and reading at least some of the processed data out of the data memory and providing these data for the step of comparison.

12. A method in accordance with claim 7, further comprising the step:

storing the processed data in a second buffer memory (107).

13. A method in accordance with claim 12, further comprising the step:

reading at least some of the processed data out of the second buffer memory (107) and providing these data for the step of comparison.

14. A method in accordance with claim 7, wherein the step of storing the raw data includes an additional storage of a feature characterizing the respective raw data; and wherein the feature characterizing the respective raw data preferably includes an unambiguous number and/or a timestamp.

15. A method in accordance with claim 7, wherein the processing of the raw data includes at least one of the following steps:

carrying out correction steps, in particular with respect to a dark current, to an offset value, to an amplification, to one or more color values or to an illuminant;

filtering for correction with respect to the taking aperture, to the contrast transfer function and/or to the image noise;

changing the spatial image resolution; or compressing the raw data.

16. A method in accordance with claim 7, wherein the steps of storing the raw data and of comparing the stored raw data with the processed data include the following steps:

fixing the size and position of an image section;

subsequently storing the raw data belonging to this image section in the first buffer memory (106); and comparing the raw data belonging to this image section with the processed data for this image section, wherein the position and/or the size of the image section are changed before a repeat storage of raw data in the first buffer memory (106).

17. A method in accordance with claim 16, wherein the steps of storing the raw data and of comparing the stored raw data with the processed data are carried out in a plurality of check processes for a number of image sections, wherein the number of image sections completely covers the surface of an image sensor provided for generating the image signals.

18. A digital camera comprising:

an image sensor (102) adapted to produce analog image signals;

an analog/digital converter (103) adapted to convert the analog image signals into digital image data;

a buffer memory (106) connected to the analog/digital converter, the buffer memory being adapted to buffer at least some of the digital image data;

a digital signal processing device (104) connected to the analog/digital converter, the digital signal processing device being adapted to produce processed image data from the digital image data;

a data memory (105) or further buffer memory (107) connected to the digital signal processing device, the data memory or further buffer memory being adapted to store at least some of the processed image data;

an evaluation device (108) connected to the buffer memory and to the data memory or further buffer memory, the evaluation device being adapted to compare at least some of the buffered digital image data buffered in the buffer memory with the stored processed image data, the evaluation device being further adapted to produce an error warning signal if a deviation between the buffered digital image data buffered in the buffer memory and the stored processed image data reaches or exceeds a predefined threshold; and a warning message output device connected to the evaluation device, the warning message output device being adapted to output at least one of an optical warning message, an acoustic warning message or a text or symbol warning message in response to the error warning signal.

19. A digital camera comprising:

an image sensor (102) adapted to produce analog image signals;

an analog/digital converter (103) adapted to convert the analog image signals into digital image data;

a buffer memory (106) connected to the analog/digital converter, the buffer memory being adapted to buffer at least some of the digital image data;

a digital signal processing device (104) connected to the analog/digital converter, the digital signal processing device being adapted to produce processed image data from the digital image data by applying processing steps to the digital image data;

a data memory (105) or further buffer memory (107) connected to the digital signal processing device, the data memory or further buffer memory being adapted to store at least some of the processed image data; and an evaluation device (108) connected to the buffer memory and to the data memory or further buffer memory, the evaluation device being adapted to produce processed buffered image data from the buffered digital image data buffered in the buffer memory by processing the buffered image data using the same processing steps applied in the digital signal processing device, wherein the evaluation device is further adapted to compare at least some of the processed buffered image data with the stored processed image data stored in the data memory or the further buffer memory.

20. A digital camera in accordance with claim 19, wherein the evaluation device (108) is adapted to process the buffered digital image data buffered in the buffer memory independently of the processing of the digital image data in the digital signal processing device (104), the evaluation device (108) being formed separately from the digital signal processing device (104).

21. A digital camera having an image sensor (102) for producing analog image signals, having an analog/digital converter (103) for converting the image signals into digital raw data, and having a signal processing device (104) for producing processed data from the raw data, wherein the signal processing device (104) has a signal output;

wherein the camera has at least one first buffer memory (106) for buffering at least some of the digital raw data and an evaluation device (108) which is made to compare raw data stored in the first buffer memory (106) with the processed data; and wherein the evaluation device (108) is made to map processing steps which are provided in the signal processing device (104) for the digital raw data and to process the raw data stored in the first buffer memory (106) using the mapped processing steps before the raw data stored in the first buffer memory (106) are compared with the processed data.

22. A method for monitoring a signal processing device (104) of a digital camera, wherein image signals are produced in the camera, the image signals are converted into raw data and the digital raw data are processed to processed data by means of the signal processing device (104), comprising the following steps:

storing at least some of the digital raw data in a first buffer memory (106);

mapping processing steps which are provided in the signal processing device (104) for the digital raw data;

processing the raw data stored in the first buffer memory (106) using the mapped processing steps; and comparing the raw data stored in the first buffer memory (106) with the processed data after the step of processing.

* * * * *